United States Patent [19]

Tsuda et al.

[11] Patent Number: 4,814,867

[45] Date of Patent: Mar. 21, 1989

[54] COLOR CORRECTION PROCESSOR WITH MEMORY ADDRESSED BY COLOR COMPONENT SIGNALS HAVING UNEVENLY-DISTRIBUTED DATA BITS

[75] Inventors: Yukifumi Tsuda; Hiroaki Kotera; Teruo Fumoto, all of Kawasaki, Japan

[73] Assignee: Matsushita Electric Industrial Co., Ltd., Osaka, Japan

[21] Appl. No.: 130,617

[22] Filed: Dec. 9, 1987

[30] Foreign Application Priority Data

Dec. 12, 1986 [JP] Japan ............... 61-296906

[51] Int. Cl.$^4$ .................. G03F 3/08; H04N 1/46
[52] U.S. Cl. ...................... 358/80; 358/78
[58] Field of Search ................ 358/78, 80

[56] References Cited

U.S. PATENT DOCUMENTS

| | | | |
|---|---|---|---|
| 4,058,828 | 11/1977 | Ladd | 358/80 |
| 4,636,844 | 1/1987 | Sasaki | 358/80 |
| 4,745,466 | 5/1988 | Yoshida et al. | 358/80 |
| 4,752,822 | 6/1988 | Kawamura | 358/80 |

FOREIGN PATENT DOCUMENTS 49-106714 10/1974 Japan.
59-210771 11/1984 Japan ................... 358/80

*Primary Examiner*—James J. Groody
*Assistant Examiner*—Randall S. Svihla
*Attorney, Agent, or Firm*—Stevens, Davis, Miller & Mosher

[57] ABSTRACT

Color correction method and processor for improving the quality of color reproduction in a color picture recording unit or display unit in a color copy machine, a color facsimile or a color printer. A memory means previously stores in a table values of secondary color correction image data used for recording corresponding to values of primary image data produced through a color scanning of a color picture. The secondary color correction image data are read out from the table by addressing signals formed from the three color components of the primary image data. Data bits for the addressing signals of the three color components of the primary image data are assigned unevenly depending on the contribution factor of each in forming the three color components of the secondary color crrection image data, thereby reducing the required number of addressing bits and associated memory.

7 Claims, 5 Drawing Sheets

COLOR CORRECTION PROCESSOR WITH MEMORY ADDRESSED BY COLOR COMPONENT SIGNALS HAVING UNEVENLY-DISTRIBUTED DATA BITS

BACKGROUND OF THE INVENTION

In reproducing a picture in natural color of intermediate tones with a conventional color copy machine, color facsimile or printer, etc. it is necessary to have a processing called "color masking process" for correcting the color turbidity of reproduced color attributable to the recording system. Major reasons for the need of color correction are the facts that dye stuffs of three primary colors (3-color) in printing ink have a spectrographic property including unwanted absorption called "subabsorption", and that mixing of 3-color inks causes additivity failure and proportionality failure among the 3-color components.

The color masking process intended to perform high-fidelity color reproduction computes the following masking equation (1) or (2) for a set of 3-color signals of yellow (Y), magenta (M) and cyan (C) or a set of signals of red (R), green (G) and blue (B), and supplies the color correction signals (C', M', Y') or (R', G', B') to the recording system so that the color turbidity is eliminated.

$$(C', M', Y') = f(C, M, Y) \quad (1)$$

or $$(R', G', B') = g(R, G, B) \quad (2)$$

Since equations (1) and (2) generally include nonlinear terms, the following second-order masking is known as a practical method for high-fidelity color reproduction.

A method conceivable to implement such computation with an apparatus is such that color correction results (C', M', Y') for all combinations of inputs (C, M, Y) in the following equation (3) are calculated out in advance, stored as a reference table in the memory and read out by using inputs (C, M, Y). This memory reference system is described in Japanese Patent Unexamined Publication (Kokai) No. 49-106714, for example. The method is flexible in the capability of dealing with various nonlinear functions besides the following equation (3).

$$\begin{bmatrix} C' \\ M' \\ Y' \end{bmatrix} = (a_{ij}) \begin{bmatrix} C \\ M \\ Y_2 \\ C_2 \\ M_2 \\ Y \\ CM \\ MY \\ YC \end{bmatrix} \quad (3)$$

where i=1 to 3, j=1 to 9, and (aij) represents a 3-by-9 color correction coefficient matrix.

The memory reference system, however, has a drawback of requiring the storage of the whole results of (C', M', Y') for all combinations of inputs (C, M, Y), and therefore it necessitates a memory of large capacity. Generally, dealing with a color picture of intermediate tones requires 6-bit data (i.e., $2^6 = 64$ levels) for each of inputs (C, M, Y). There are combinations of $2^{6+6+6} = 2^{18}$ in number for obtaining each of C', M' and Y', requiring for each color memory devices 301–303 of $2^{18} \times 6$ bits (about $1.57 \times 10^6$ bits) and such an apparatus is expensive to build. The same problem as mentioned above arises for the case of 3-signal set (R, G, B).

SUMMARY OF THE INVENTION

This invention is intended to improve the quality of color reproduction in a color picture recording unit or display unit. The primary object of this invention is to provide color correction method and color correction processor including a memory means in which values of secondary color correction image data used for recording corresponding to values of primary image data produced through color scanning on a color picture are stored as a table and the secondary color correction image data is retrieved from the table by being addressed with the primary image data, wherein data bits are unevenly assigned to 3-color components which constitute the primary image data which assignment depends on their contribution degrees in forming the 3-color components of the secondary color correction image data, thereby reducing or eliminating color information bits of the primary image data with low contribution degree.

DESCRIPTION OF THE PREFERRED EMBODIMENTS

Figure 1:
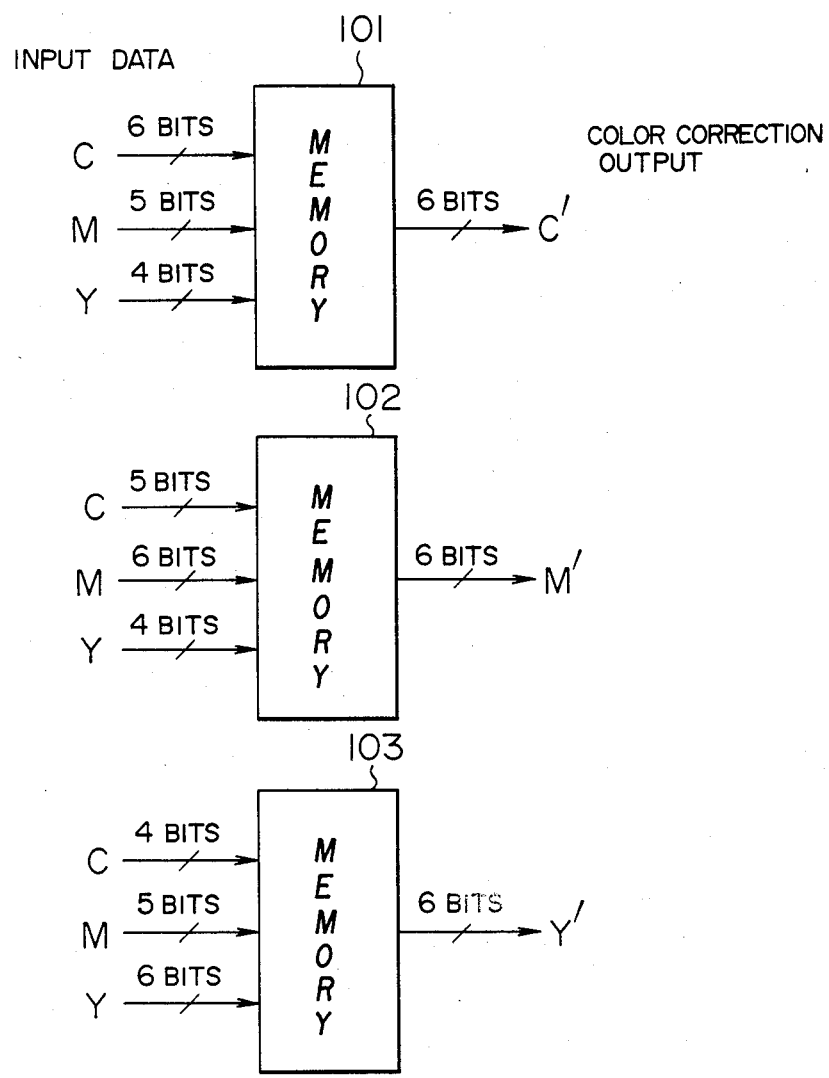
FIG. 1 is a block diagram of the table memory which is a major section of a color correction processor embodying the present invention.

The concept of this invention will first be described. The right side of the above equation (3) is expanded for output C' as follows.

$$C' = (a_{11}C + a_{12}M + a_{13}Y) + (a_{14}C^2 + a_{15}M^2 + a_{16}Y^2 + a_{17}CM + a_{18}MY + a_{19}YC) \quad (4)$$

The first-parenthesized term of equation (4) is a first-order term representing linear color correction factors and the second-parenthesized term is a second-order term for correcting nonlinear distortion.

As regards to the degree of contribution to C' of each factor in equation (4), the original signal C apparently has the most intense reflection on C', and $a_{11}C$ is dominant in the first-order term and $a_{14}C^2$ is dominant in the second-order term. The next major contributive factors to C' are those including M. The reason is that in the printing ink, in general, magenta ink includes a great deal of cyan component as its sub-absorption property. In contrast, yellow ink is low in sub-absorption and high in purity, and therefore terms including Y are less contributive to C'.

On this account, by changing the bit assignment or accuracy for the original input signals (C, M, Y) depending on the contribution degree of each factor constituting equation (4), equation (4) can be approximated with less amount of information.

In equation (4), an example of masking coefficients for a color printer is as follows.

$$a_{11} = 1.40; a_{12} = -0.47; a_{13} = -0.01;$$
$$a_{14} = 0.005; a_{15} = 0.002; a_{16} = -0.0003;$$
$$a_{17} = -0.003; a_{18} = -0.002; a_{19} = -0.004$$

The comparison of these coefficients reveals an evident difference, and therefore down-grading of accuracy of primary image data associated with small coefficients does not affect the result of color correction computation.

Specifically, information bit allotment to (C, M, Y) for expressing C' is changed from the conventional allotment (6, 6, 6) to (6, 5, 4), for example, thereby reducing one bit for M and two bits for Y to define C' without involving significant error. In this case, the number of possible combinations of (C, M, Y) is $2^{6+5+4}=2^{15}$, and they can be contained in a table memory with a capacity as small as ⅛ of $2^{6+6+6}=2^{18}$ of the case without bit reduction. The remaining color signals M' and Y' can also be expressed by such modified bit allotments.

Similarly, expansion of equation (2) for R results as follows.

$$R'=(b_{11}R+b_{12}G+b_{13}B)+(b_{14}R^2+b_{15}G^2+b_{16}B^2 +b_{17}RG+b_{18}GB+b_{19}BR) \qquad (5)$$

Also in this case, contribution degree of each factor to R' differs, and the equation can be approximated with less information by modifying the bit allotment accordingly.

Specifically, a 3-signal set $(C_1, M_1, Y_1)$ of cyan, magenta and yellow constituting the primary image data and serving as the address input to the memory which yields a secondary corror correction signal set $(C_2, M_2, Y_2)$ from $(C_1, M_1, Y_1)$ are given bit allotments such that $C_1$ has a maximum number of bits for $C_2$, $M_1$ has maximum bits for $M_2$ and $Y_1$ has maximum bits for $Y_2$.

Alternatively, bit allotments for the primary 3-color signal set $(C_1, M_1, Y_1)$ for producing the secondary color correction data $(C_2, M_2, Y_2)$ may be made to have the respective numbers of bits in the order of $C_1 \geq M_1 > Y_1$ for $C_2$, in the order of $M_1 \geq C_1 > Y_1$ for $M_2$, and in the order of $Y_1 \geq M_1 > C_1$ for $Y_2$.

Similarly the bit allotments may be made to have the respective numbers of bits in the order of $C_1 > M_1 \geq Y_1$ for $C_2$, in the order of $M_1 > C_1 \geq Y_1$ for $M_2$, and in the order of $Y_1 > M_1 \geq C_1$ for $Y_2$.

Further alternatively, among the primary 3-color signal set $(C_1, M_1, Y_1)$, $C_1$ and $M_1$ are used for obtaining secondary data $C_2$, and similarly $C_1$ and $M_1$ are used for $M_2$, and $M_1$ and $Y_1$ are used for $Y_2$. Namely, primary image data with the lowest contribution degree is removed in implementing color correction.

In place of such a 3-color signal set constituting the primary image data, a set (R, G, B) for their complementary colors, i.e., red (R), green (G) and blue (B) are used so that $(R_1, G_1, B_1)$ serving as the address inputs to the memory which yields a secondary color correction signal set $(R_2, G_2, B_2)$ are given bit allotments such that $R_1$ has a maximum number of bits for $R_2$, $G_1$ has maximum bits for $G_2$ and $B_1$ has maximum bits for $B_2$.

Still alternatively, bit allotments for the primary 3-color signal set $(R_1, G_1, B_1)$ may be determined to hold $R_1 \geq G_1 > B_1$ for producing the secondary color correction data $R_2$, to hold $G_1 \geq R_1 > B_1$ for $G_2$, and to hold $B_1 \geq G_1 > R_1$ for $B_2$.

Next, the invention will be described in more detail with reference to the drawings. FIG. 1 shows an embodiment of the table memory which is a major section of the inventive color correction processor, wherein 101, 102, 103 depicts ROM (read-only memory) or RAM (random access memory) devices for generating the color correcting signals C', M' and Y'. The memory devices 101–103 have their address inputs given the sets of original signal data (C, M, Y) in the bit allotments as shown. The memory devices 101–103 have tables produced in advance by writing values derived from equation (3) which were calculated with the respective input bit accuracies. The table data is read out sequentially by being addressed by data (C, M, Y) and delivered to a color picture recorder. In this embodiment, each memory device has 15-bit address inputs, and these bits are allotted in correspondence to (C, M, Y) such as (6, 5, 4) bits for C', (5, 6, 4) bits for M', and (4, 5, 6) bits for Y'. Accordingly, the memory capacity required for each color is not greater than 32 kilo ($2^{15}$) bytes. Namely, only a single semiconductor memory device for each color suffices to store the data table, and it is very economical for the processor.

Figure 2:
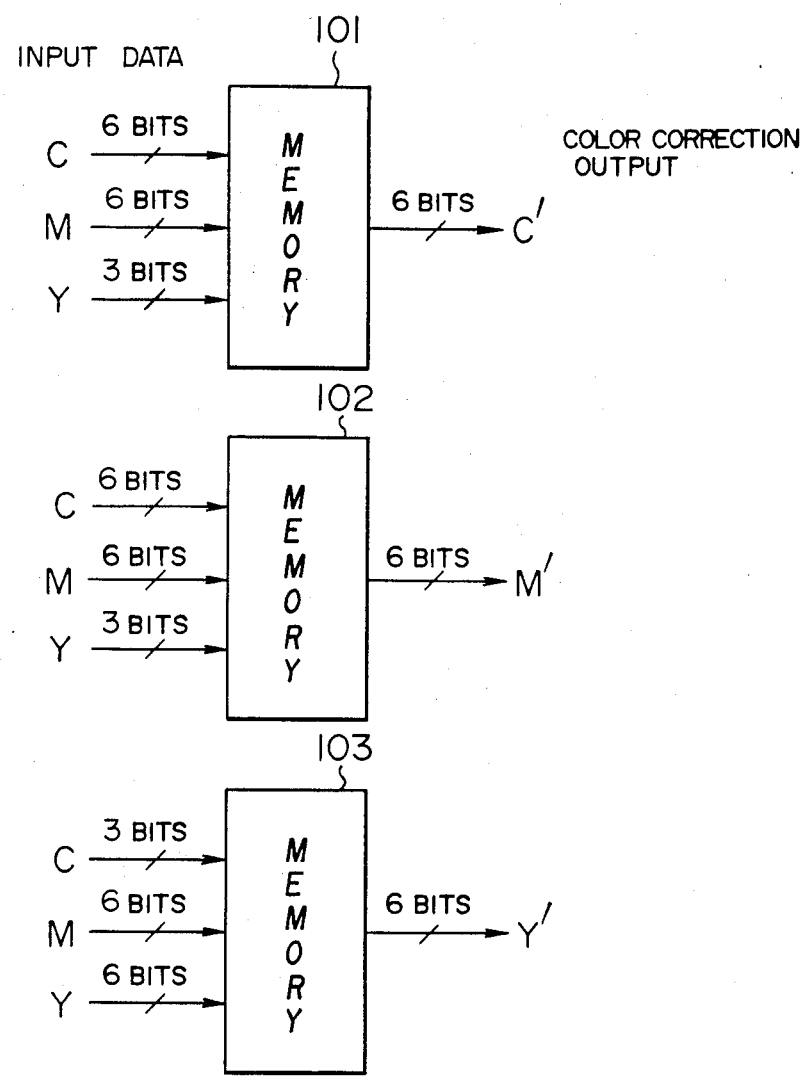
FIG. 2 is a block diagram of the table memory which is a major section of the color correction processor according to another embodiment of this invention.

FIG. 2 shows another embodiment of this invention, in which the bit allotment is further modified depending on the color correction contribution degree. The capacity of table memory is the same as the case of FIG. 1.

Figure 3:
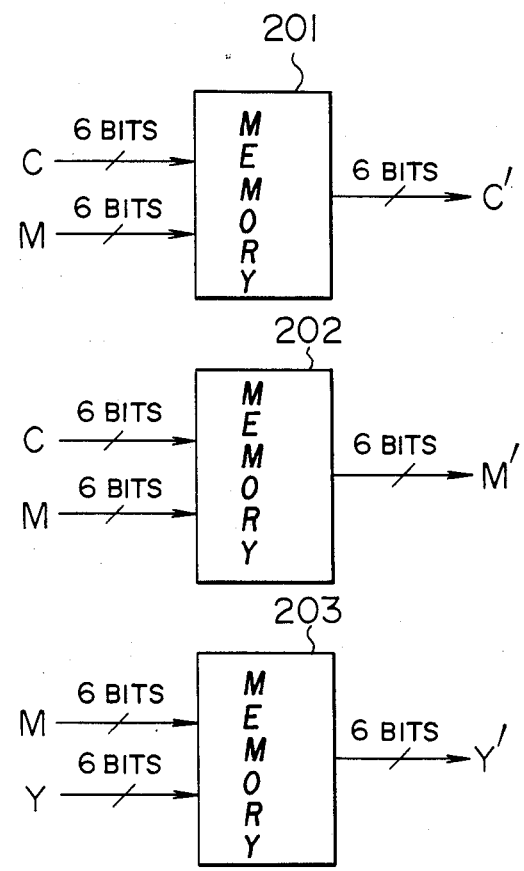
FIGS. 3, 4 and 5 are block diagrams of the table memory which is a major section of the color correction processor according to still other embodiments of this invention.

FIG. 3 shows another embodiment of the table memory arrangement, which is further simplified. In this embodiment, the bit allotment is eliminated for a color component with the least contribution among the 3-color signal inputs (C, M, Y). Consequently, approximate color correction data is obtained simply through approximate computation with a combination (C, M) for C', (C, M) for M', and (M, Y) for Y', and the total memory capacity is further reduced to 4 kilo ($2^{6+6}$) bytes, while allotting 6 bits to each color component. In this case, instead of using separate semiconductor devices 201, 202 and 203 for all colors, a single memory device can be shared by all, whereby the processor can be built further economically.

Figure 4:
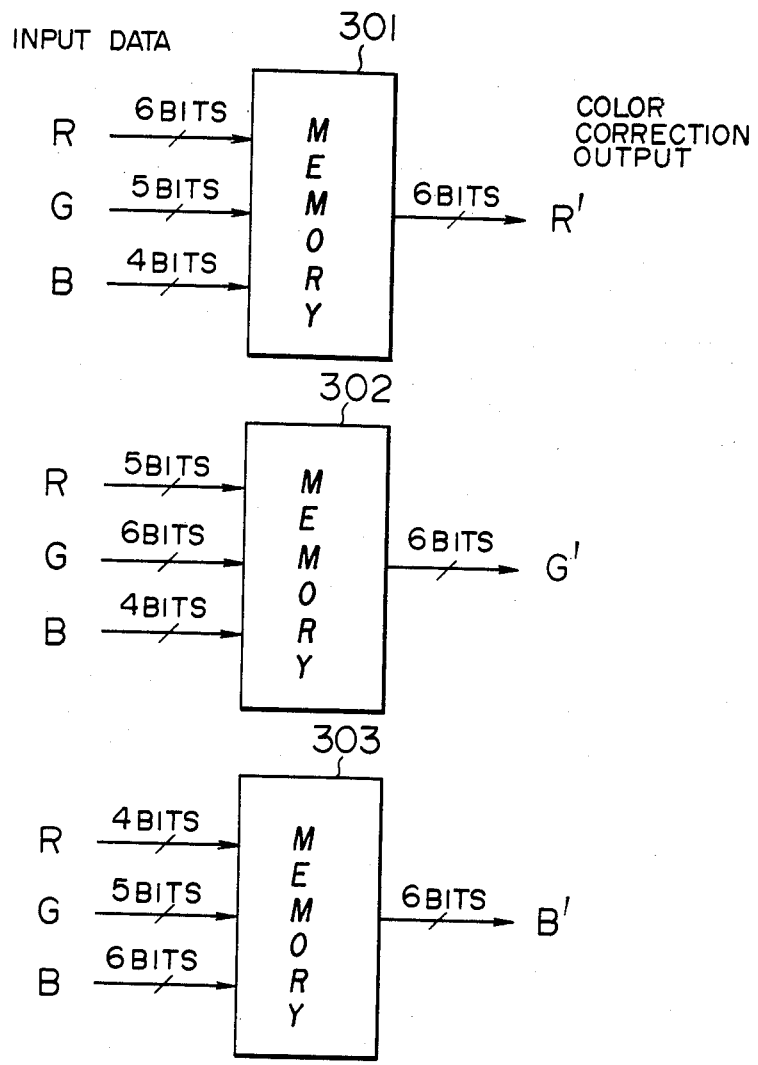

FIG. 4 is an embodiment of the case of a 3-color set made up of red, green and blue for the image data. Its details are like to those in the cases of FIGS. 1, 2 and 3, and explanation is omitted.

Figure 5:
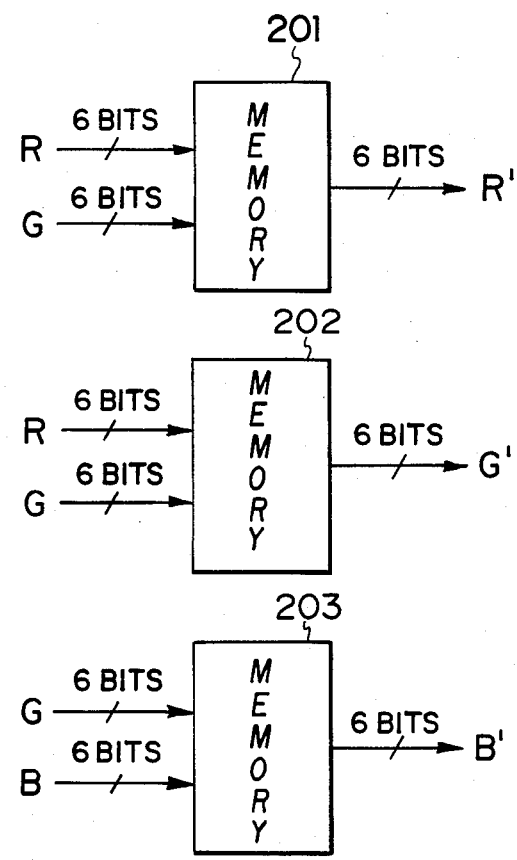

FIG. 5 is an embodiment like that of FIG. 3, but using a 3-color set made up of red, green and blue components for the image data.

According to this invention, as described above, a memory means is provided so that individual values of secondary color correction image data are memorized as tables in advance for printing or recording to be taken in correspondence to individual values of primary image data, represented by image data and graphic data created artificially using CG and CAD systems or produced through the color scanning on an original picture, and the secondary color correction image data is retrieved from the memory means by being addressed by the primary image data, and the bit allotment to 3-color components of the primary image data is made unevenly depending on their contribution degrees of the formation of respective 3-color component of the secondary color correction image data, thereby reducing or eliminating color information bits of primary image data with low contribution degree, whereby the number of combinations of referenced memory data can be reduced significantly and the memory capacity can be saved.

We claim:

1. A color correction processor comprising memory means for storing individual values of secondary color correction image data to be used for printing or recording in correspondence to individual values of primary image data produced through color scanning of a color picture, and means for supplying addressing signals to said memory means to cause said secondary color correction image data to be retrieved in accordance with said primary image data, wherein data bits of said addressing signals are allotted to three color components forming said primary image data unevenly depending on the degree of contribution of each color component in forming three color components of said secondary color correction image data, with data bits of one color component of said primary image data with a lowest contribution degree being omitted for each color component of said second color correction image data.

2. A processor according to claim 1 wherein three color components cyan, magenta and yellow ($C_1$, $M_1$, $Y_1$) form said primary image data.

3. A processor according to claim 1, wherein bit allotments for three color components ($C_1$, $M_1$, $Y_1$) of cyan, magenta and yellow forming said primary image data and serving as addressing signals to said memory means for producing three color components ($C_2$, $M_2$, $Y_2$) of cyan, magenta and yellow forming said secondary color correction image data from said primary image data ($C_1$, $M_1$, $Y_1$) are made such that bits are allotted for two components ($C_1$, $M_1$) to produce $C_2$, bits are allotted for two components ($C_1$, $M_1$) to produce $C_2$, and bits are allotted for two components ($M_1$, $Y_1$) to produce $Y_2$.

4. A processor according to claim 3, wherein bit allotments for the three components $C_1$, $M_1$, $Y_1$ of said primary image data for producing the three components $C_2$, $M_2$, $Y_2$ of said secondary color correction image data are made to have respective numbers of bits in the order of $C_1 \geq M_1$ in the allotted bits ($C_1$, $M_1$) for $C_2$, $M_1 \geq C_1$ in the allotted bits ($C_1$, $M_1$) for $M_2$, and $Y_1 \geq M_1$ in the allotted bits ($M_1$, $Y_1$) for $Y_2$.

5. A processor according to claim 1, wherein three color components red, green and blue ($R_1$, $G_1$, $B_1$) form said primary image data.

6. A processor according to claim 1 wherein bit allotments for three color components ($R_1$, $G_1$, $B_1$) of red, green and blue forming said primary image data and serving as addressing signals to said memory means for producing three color components ($R_2$, $G_2$, $B_2$) of red, green and the blue forming said secondary color correction image data from said primary image data ($R_1$, $G_1$, $B_1$) are made such that bits are allotted for two components ($R_1$, $G_1$) to produce $R_2$, bits are allotted for two components ($R_1$, $G_1$) to produce $G_2$, and bits are allotted for two components ($G_1$, $B_1$) to produce $B_2$.

7. A processor according to claim 6 wherein bit allotments for the three components $R_1$, $G_1$, $B_1$ of said primary image data for producing the three components $R_2$, $G_2$, $B_2$ of said secondary color correction data are made to have respective numbers of bits in the order of $R_1 \geq G_1$ in the allotted bits ($R_1$, $G_1$) for $R_2$, $G_1 \geq R_1$ in the allotted bits ($R_1$, $G_1$) for $G_2$, and $B_1 \geq G_1$ in the allotted bits ($G_1$, $B_1$) for $B_2$.

* * * * *